(12) United States Patent
Dean et al.

(10) Patent No.: US 7,794,844 B2
(45) Date of Patent: Sep. 14, 2010

(54) DUAL CURE COATING COMPOSITIONS, MULTI-COMPONENT COMPOSITE COATINGS, AND RELATED COATED SUBSTRATES

(75) Inventors: Roy E. Dean, Lower Burrell, PA (US); Charles M. Kania, Natrona Heights, PA (US); Cynthia Kutchko, Pittsburgh, PA (US); Brian K. Rearick, Allison Park, PA (US); William H. Retsch, Jr., Allison Park, PA (US); John E. Schwendeman, Wexford, PA (US); Shengkui Hu, Tianjin (CN)

(73) Assignee: PPG Industries Ohio, Inc., Cleveland, OH (US)

( * ) Notice: Subject to any disclaimer, the term of this patent is extended or adjusted under 35 U.S.C. 154(b) by 491 days.

(21) Appl. No.: 11/861,703

(22) Filed: Sep. 26, 2007

(65) Prior Publication Data

US 2009/0082514 A1 Mar. 26, 2009

(51) Int. Cl.
*B32B 25/20* (2006.01)
(52) U.S. Cl. .................. 428/447; 525/474
(58) Field of Classification Search ............. 428/447; 525/474
See application file for complete search history.

(56) References Cited

U.S. PATENT DOCUMENTS

| 3,020,255 A | 2/1962 | Magrane et al. ............ 260/45.3 |
| 4,025,407 A | 5/1977 | Chang et al. ............ 204/159.14 |
| 4,266,053 A | 5/1981 | Imanaka et al. ............. 544/196 |
| 4,293,678 A | 10/1981 | Carter et al. ................... 528/32 |
| 4,680,204 A | 7/1987 | Das et al. ................. 427/407.1 |
| 4,847,336 A | 7/1989 | Gerhardt ..................... 525/518 |
| 4,908,274 A | 3/1990 | Jachmann et al. ............ 428/452 |
| 4,963,438 A | 10/1990 | Weitemeyer et al. ........ 428/447 |
| 4,978,726 A | 12/1990 | Döhler et al. ................ 525/479 |
| 5,248,789 A | 9/1993 | Wolff .......................... 549/215 |
| 5,296,571 A | 3/1994 | Hori et al. ................... 526/261 |
| 5,407,818 A | 4/1995 | von Gentzkow et al. .... 435/180 |
| 5,494,815 A | 2/1996 | von Gentzkow et al. .... 435/174 |
| 5,552,506 A | 9/1996 | Ebbrecht et al. ............. 528/15 |
| 5,977,282 A | 11/1999 | Ebbrecht et al. ............. 528/29 |
| 6,211,322 B1 | 4/2001 | Döhler et al. ................. 528/15 |
| 6,268,404 B1 | 7/2001 | Döhler et al. ................. 522/99 |
| 6,610,777 B1 | 8/2003 | Anderson et al. ........... 524/588 |
| 6,833,186 B2 | 12/2004 | Perrine et al. ............... 428/329 |
| 7,053,149 B2 | 5/2006 | Anderson et al. ........... 524/588 |
| 7,141,618 B2 | 11/2006 | Schneider et al. ........... 523/212 |
| 2002/0132871 A1 | 9/2002 | Colton et al. ................... 522/7 |
| 2004/0214911 A1 | 10/2004 | DeSaw et al. ................. 522/99 |
| 2004/0225057 A1 | 11/2004 | Anderson et al. ........... 524/588 |
| 2005/0261391 A1* | 11/2005 | Narayan-Sarathy et al. . 522/173 |
| 2005/0287300 A1 | 12/2005 | Herrwerth et al. ........ 427/255.5 |

FOREIGN PATENT DOCUMENTS

| EP | 1 726 607 A2 | 11/2006 |
| GB | 2 067 210 A | 7/1981 |

* cited by examiner

*Primary Examiner*—Kuo-Liang Peng
(74) *Attorney, Agent, or Firm*—Donald R. Palladino

(57) ABSTRACT

Disclosed herein are dual cure coating compositions that include a melamine group-containing polyethylenically unsaturated compound and a polysiloxane. Also disclosed are related multi-component composite coatings, coated substrates, and methods for coating a substrate.

5 Claims, No Drawings

DUAL CURE COATING COMPOSITIONS, MULTI-COMPONENT COMPOSITE COATINGS, AND RELATED COATED SUBSTRATES

FIELD OF THE INVENTION

The present invention relates to dual cure coating compositions, multi-component composite coatings, and related coated substrates.

BACKGROUND INFORMATION

Despite their many environmental and energy savings advantages, radiation-curable compositions are used successfully in limited commercial applications. It would be desirable, therefore, to provide radiation-curable compositions capable of producing coatings having performance characteristics that might render the compositions desirable for use in applications that, heretofore, have rarely, if ever, employed radiation cure technology. Such performance characteristics include, for example, a smooth pleasing appearance suitable for, among other things, automotive and consumer products applications, resistance to scratch and mar, and exterior durability. Moreover, it would be desirable to provide such compositions that can be embodied as a one-component composition, and can be cured rapidly via radiation in an air environment and without the formation of "knit lines."

SUMMARY OF THE INVENTION

In certain respects, the present invention is directed to dual cure coating compositions, such as one-component dual cure coating compositions. The coating compositions comprise: (a) a melamine group-containing polyethylenically unsaturated compound; and (b) a polysiloxane having the general structure:

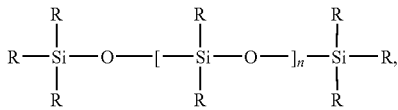

wherein n ranges from 0 to 100, and each R, which may be identical or different, represents a group selected from H, OH, a monovalent hydrocarbon group, a monovalent siloxane group, a hydroxy-functional alkyl ester (meth)acrylate, and mixtures of any of the foregoing, with the proviso that at least one of the groups represented by R is a hydroxy-functional alkyl ester (meth)acrylate.

In other respects, the present invention is directed to multi-component composite coatings comprising: (a) a first coating formed from a composition comprising a melamine group-containing polyethylenically unsaturated compound comprising a plurality of alkoxy groups; and (b) a second coating deposited directly adjacent to the first coating and comprising a film-forming resin comprising functional groups reactive with the alkoxy groups of the melamine group-containing polyethylenically unsaturated compound.

The present invention is also directed to methods for coating a substrate, as well as related coated substrates.

DETAILED DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As previously mentioned, certain embodiments of the present invention are directed to dual cure coating compositions. As used herein, the term "dual cure" coating composition refers to a composition that will cure upon exposure to two different cure conditions. For example, in certain embodiments, the dual cure compositions of the present invention will cure upon exposure to a combination of thermal energy and radiation. As used herein, thermal energy is intended to include radiant energy such as infrared or microwave energy and the like; or conductive thermal energy such as that produced by a heated platen or hot air oven, for example. As used herein, the term "radiation" refers to ionizing radiation (e.g., electron beams) and/or actinic light (e.g., UV light).

Coating compositions that will cure upon exposure to radiation are often called radiation-curable compositions and, as such, comprise compounds that include radiation curable groups. As used herein, the term "radiation curable group(s)" refers to any functional group that can react, such as via an addition reaction, upon exposure to ionizing radiation and/or actinic light. Examples of such groups include, but are not limited to, (meth)acrylates, vinyl ethers, ethylenically unsaturated resins, maleic unsaturated polyesters, fumarates, thiols, alkenes, epoxies and the like. As used herein, "(meth) acrylate" and like terms are used herein to refer to both acrylate and methacrylate.

In certain embodiments, the dual cure compositions of the present invention are embodied as a one-component composition. As used herein, the term "one-component coating composition" refers to a coating composition where, during storage of the composition, the composition components are all admixed together but the properties of the composition, including viscosity, remain consistent enough over the time of storage to permit successful application of the coating onto a substrate at a later time.

As previously indicated, the dual cure compositions of the present invention comprise a melamine group-containing polyethylenically unsaturated compound. As used herein, the term "melamine group-containing polyethylenically unsaturated compound" refers to compounds comprising a triazine ring having attached thereto a plurality of carbon-carbon double bonds. For example, in certain embodiments, the melamine group-containing polyethylenically unsaturated compound is a melamine group-containing poly(meth)acrylate, which, as used herein, refers to compounds comprising a triazine ring having attached thereto a plurality of (meth) acrylate groups that may be the same or different.

Melamine group-containing poly(meth)acrylates that are believed to be suitable for use in the present invention, include, without limitation, compounds encompassed by the general structure described in U.S. Pat. No. 4,266,053 ("the '053 patent") at col. 2, line 53 to col. 3, line 15, which can be prepared according to the procedure described in the '053 patent at col. 4, line 47 to col. 7, line 60, the cited portions of which being incorporated herein by reference; compounds encompassed by the general structures described in U.S. Pat. No. 5,296,571 ("the '571 patent") at col. 2, lines 1-45 and col. 3, lines 7-59, which can be prepared according to the procedure described in the '571 patent at col. 4, line 1 to col. 7, line 20, the cited portions of which being incorporated herein by reference; and compounds encompassed by the general structure described in U.S. Pat. No. 3,020,255 ("the '255 patent") at col. 2, line 53 to col. 3, line 2, which can be prepared according to the procedure described in the '255 patent at col. 4, lines 13-32, the cited portions of which being incorporated herein by reference.

In certain embodiments, the melamine group-containing polyethylenically unsaturated compound that is used the present invention comprises a plurality of alkoxy groups, such as methoxy or ethoxy groups. As a result, in certain embodiments, the melamine group-containing polyethylenically unsaturated compound is represented by the general formula:

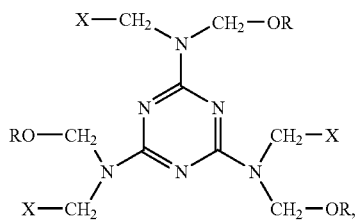

wherein each R, which may be the same or different, represents a $C_1$-$C_4$ alkyl group, such as a methyl group, and each X, which may be the same or different, represents a moiety comprising a carbon-carbon double bond, such as, for example, a (meth)acrylate and/or a (meth)acrylamide. It is believed that compounds encompassed by the foregoing general structure are commercially available from Bomar Specialties Co., an example of which is the multi-functional melamine (meth)acrylate sold under the tradename BMA-250. Moreover, a compound encompassed by the foregoing general structure can be made by reacting a compound encompassed by the general structure described in the '053 patent, referenced above, with formaldehyde.

Indeed, as will be described in more detail below, it has been discovered that the use of a melamine group-containing polyethylenically unsaturated compound comprising a plurality of alkoxy groups can be particularly advantageous when the coating composition of the present invention is intended to be applied to a substrate directly adjacent to another coating comprising a film-forming resin comprising functional groups reactive with the alkoxy groups of the melamine group-containing polyethylenically unsaturated compound.

In certain embodiments of the present invention, the melamine group-containing (meth)acrylate is present in an amount of at least 10 percent by weight, such as at least 20 percent by weight, with the weight percents being based on the total weight of resin solids in the coating composition. In certain embodiments of the present invention, the melamine group-containing (meth)acrylate is present in an amount of no more than 50 percent by weight, such as no more than 40 percent by weight, with the weight percents being based on the total weight of resin solids in the coating composition. The amount of melamine group-containing (meth)acrylate in the composition can range between any combination of the recited values inclusive of the recited values.

As previously mentioned, in certain embodiments, the radiation curable compositions of the present invention also comprise a polysiloxane having the general structure:

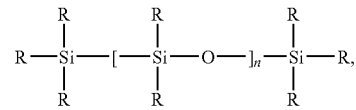

wherein n ranges from 0 to 100, such as 0 to 10 or, in some cases, 0 to 3, and each R, which may be identical or different, represents a group selected from H, OH, a monovalent hydrocarbon group, a monovalent siloxane group, a hydroxy-functional alkyl ester (meth)acrylate, and mixtures of any of the foregoing, with the proviso that at least one of the groups represented by R is a hydroxy-functional alkyl ester (meth)acrylate. As used herein, the term "hydroxy-functional alkyl ester (meth)acrylate" refers to a linear, cyclic, aromatic or branched hydrocarbon radical comprising at least one OH group, to which there are attached, by way of an ester linkage, one or more (meth)acrylic acid units.

In certain embodiments, the foregoing polysiloxanes are prepared from the hydrosilylation reaction of a polysiloxane containing silicon hydride with an ethylenically unsaturated epoxy compound to produce an epoxy-functional polysiloxane, which is then reacted with (meth)acrylic acid produce a polysiloxane of the general formula described above.

Polysiloxanes containing silicon hydride, which are suitable for use in producing a polysiloxane of the foregoing general formula, include, for example, those of the general formula:

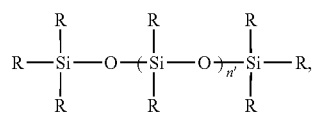

wherein each substituent group R, which may be identical or different, represents a group selected from H, OH, a monovalent hydrocarbon group, a monovalent siloxane group, and mixtures of any of the foregoing, with the proviso that at least one of the groups represented by R is H, and n' ranges from 0 to 100, such as 0 to 10, or, in some cases, 0 to 5, such that the percent of Si—H content of the polysiloxane ranges from 2 to 50 percent, such as 5 to 25 percent. Examples of a polysiloxane containing silicon hydride are 1,1,3,3-tetramethyl disiloxane and polysiloxane containing silicon hydrides where n is 4 to 5, commercially available from Emerald Performance Materials as MASILWAX BASE.

As indicated, the foregoing polysiloxanes included in certain embodiments of the coating compositions of the present invention can be prepared from an epoxy-functional polysiloxane that is the hydrosilylation reaction product of a polysiloxane containing silicon hydride as described above with an ethylenically unsaturated epoxy compound, i.e., a compound comprising an epoxy group and an C═C double bond. Examples of ethylenically unsaturated epoxy compounds, which are suitable for use in the present invention, include, without limitation, allyl glycidyl ether, 2-methyl-allyl glycidyl ether, epoxy butene, methacrylic acid glycidyl ester, vinyl cyclohexene oxide, vinyl norbornene oxide, and limonene oxide, as well as mixtures thereof.

The hydrosilylation reaction may be carried out under any suitable conditions that can be readily determined by those skilled in the art, such as, for example, those demonstrated in the Examples herein. In certain embodiments, the reaction is carried out at a temperature of 80 to 110° C., such as 90 to 105° C. In certain embodiments, a stoichiometrically excess amount of ethylenically unsaturated epoxy compound is used, such that 70 to 99 percent, of the ethylenically unsaturated groups are reacted with the Si—H groups of the polysiloxane containing silicon hydride. Moreover, the hydrosilylation reaction may be carried out in the presence of a solvent that is inert to the reactants, such as, for example, aromatic and/or aliphatic solvents, including xylene, toluene and Solvesso, ketones, such as acetone, methylethylketone and methylisobutylketone, alkanols such as methanol, n-butanol and isopropanol, esters, such as ethyl acetate and butyl acetate, glycol esters and ethers, such as propylene glycol monomethyl ether, esters, such as dimethyladipate, dimethylsuccinate and dimethylglutarate, as well as mixtures thereof. In certain embodiments, a hydrosilylation reaction catalyst is used, such as a platinum group metal catalyst, for example, $H_2PtCl_6$.

Moreover, as previously indicated, the polysiloxane present in certain embodiments of the coating compositions of the present invention can be prepared by subsequent reaction of the hydrosilylation reaction product described above with (meth)acrylic acid. This reaction may be carried out under any suitable conditions that can be readily determined by those skilled in the art, such as, for example, those demonstrated in the Examples herein. In certain embodiments, the reaction is carried out at a temperature of 80 to 140° C., such as 80 to 100° C. In certain embodiments, a stoichiometrically equal amount of the reactants are used, however, in other embodiments, a stoichiometric excess of the hydrosilylation reaction product may be present. Moreover, the reaction may be carried out in the presence of a solvent that is inert to the reactants, such as, for example, the solvents discussed earlier with respect to the hydrosilylation reaction. In certain embodiments, a reaction catalyst is used. Nonlimiting examples of epoxy acid base catalysts, which are suitable for use in the present invention, include tertiary amines, such as N,N'-dimethyldodecyl amine catalysts. The amount of optional catalyst used is a catalytic amount, i.e., an amount necessary to catalyze the polymerization of the reactants.

Typically the amount of catalyst ranges from 0.01 to 10 weight percent, such as from 0.1 to 3 weight percent, based on the total weight of the reactants. In addition, a reaction inhibitor may be included for stability. For example, butylated hydroxy-toluene, hydroquinone, phenothiazine, or methyl ether hydroquinone can be used.

As will be appreciated from the foregoing description, in certain embodiments of the present invention, the hydroxy-functional alkyl ester (meth)acrylate has the structure

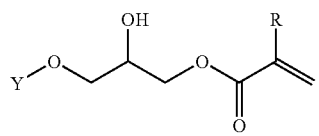

or the structure

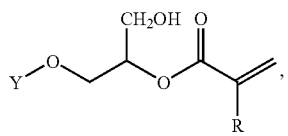

wherein R is H or $CH_3$ and Y is a linkage to a silicon atom.

In other embodiments, the foregoing polysiloxanes comprising a hydroxy-functional alkyl ester (meth)acrylate are prepared from the hydrosilylation reaction of a polysiloxane containing silicon hydride with an ethylenically unsaturated alcohol to produce a polysiloxane containing hydroxyl functional groups. This hydroxyl functional group-containing polysiloxane is then reacted with an anhydride to form a half-ester acid group under conditions that favor only the reaction of the anhydride and the hydroxyl functional groups and avoid further esterification from occurring. The half-ester group-containing reaction product thus prepared is then further reacted with a monoepoxide to produce a polysiloxane comprising a hydroxy-functional alkyl ester (meth)acrylate suitable for use in the present invention.

Polysiloxanes containing silicon hydride suitable for use in the foregoing method of preparing a hydroxy-functional alkyl ester (meth)acrylate suitable for use in the present invention include those described earlier.

Ethylenically unsaturated alcohols suitable for use in the foregoing method of preparing a polysiloxane comprising a hydroxy-functional alkyl ester (meth)acrylate suitable for use in the present invention include, without limitation, allyl alcohol; allyl ether alcohols, such as trimethylolpropane monoallyl ether, 2-allyloxyethanol, pentaerythritol monoallyl ether, trimethylolpropane diallyl ether, and allyl glycidyl ether-carboxylic acid adducts; alkenyl alcohols, such as 5-hexen-1-ol and 9-decen-1-ol; alkylenic acid-epoxy adducts, such as undecylenic acid-epoxy adducts, and mixtures of any of the foregoing. Also suitable are ethylenically unsaturated polyoxyalkylene alcohols, such as polyethoxylated, polypropoxylated, or polybutoxylated allyl or alkenyl alcohols (for example allyl alcohol propoxylate). Mixtures of poly(ethylenically unsaturated) alcohols with mono-ethylenically unsaturated alcohols are suitable as well.

Anhydrides suitable for use in the foregoing method of preparing a polysiloxane comprising a hydroxy-functional alkyl ester (meth)acrylate suitable for use in the present invention include, without limitation hexahydrophthalic anhydride, methyl hexahydrophthalic anhydride, phthalic anhydride, trimellitic anhydride, succinic anhydride, chlorendic anhydride, alkenyl succinic anhydride, and substituted alkenyl anhydrides such as octenyl succinic anhydride, and mixtures of any of the foregoing.

Monoepoxides suitable for use in the foregoing method of preparing a polysiloxane comprising a hydroxy-functional alkyl ester (meth)acrylate suitable for use in the present invention include, without limitation, glycidyl acrylate (2,3-epoxypropyl acrylate), glycidyl methacrylate (2,3-epoxypropyl methacrylate) and the addition products of 1 mole of acrylic acid or methacrylic acid with bis-epoxy compounds, such as hexanediol bisglycidyl ether, bisphenol A-bis-glycidyl ether or hexahydrophthalic acid bisglycidyl ester, as well as mixtures of any of the foregoing.

As will be appreciated from the foregoing description, in certain embodiments of the present invention, the hydroxy-functional alkyl ester (meth)acrylate has the following general structure:

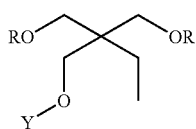

wherein Y is a linkage to a silicon atom, and R is H,

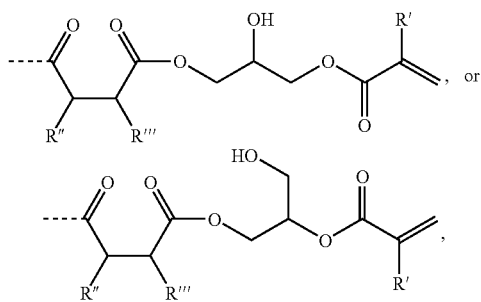

with the proviso that at least one R is not H, R' is H or CH$_3$ and R" and R''' are each independently H, an alkyl group, an aryl group, or a cycloaliphatic group.

In certain embodiments of the present invention, the foregoing polysiloxane comprising a hydroxy-functional alkyl ester (meth)acrylate is present in the coating composition in an amount of at least 1 percent by weight, such as at least 10 percent by weight, with the weight percents being based on the total weight of resin solids in the coating composition. In certain embodiments of the present invention, the foregoing polysiloxane is present in an amount of no more than 30 percent by weight, such as no more than 20 percent by weight, with the weight percents being based on the total weight of resin solids in the coating composition. The amount of the foregoing polysiloxane present in the composition can range between any combination of the recited values inclusive of the recited values.

In certain embodiments, the coating compositions of the present invention further comprise a plurality of particles. In certain embodiments, such particles have an average particle size less than 50 microns, such as 1 to less than 1000 nanometers, 1 to less than 300 nanometers, or, in some cases 1 to less than 100 nanometers, in yet other cases, 5 to 50 or 5 to 25 nanometers, prior to incorporation into the composition.

In certain embodiments where the average particle size of the particles is greater than one micron, the average particle size can be measured according to known laser scattering techniques. For example, the average particle size of such particles can be measured using a Horiba Model LA 900 laser diffraction particle size instrument, which uses a helium-neon laser with a wave length of 633 nm to measure the size of the particles and assumes the particle has a spherical shape, i.e., the "particle size" refers to the smallest sphere that will completely enclose the particle.

In embodiments of the present invention wherein the size of the particles is less than or equal to one micron, the average particle size can be determined by visually examining an electron micrograph of a transmission electron microscopy ("TEM") image, measuring the diameter of the particles in the image, and calculating the average particle size based on the magnification of the TEM image. For example, a TEM image with 105,000× magnification can be produced, and a conversion factor is obtained by dividing the magnification by 1000. Upon visual inspection, the diameter of the particles is measured in millimeters, and the measurement is converted to nanometers using the conversion factor. The diameter of the particle refers to the smallest diameter sphere that will completely enclose the particle.

The shape (or morphology) of the particles can vary depending upon the specific embodiment of the present invention and its intended application. For example generally spherical morphologies (such as solid beads, microbeads, or hollow spheres), can be used, as well as particles that are cubic, platy, or acicular (elongated or fibrous). Additionally, the particles can have an internal structure that is hollow, porous or void free, or a combination of any of the foregoing, e.g., a hollow center with porous or solid walls.

Mixtures of one or more particles having different compositions, average particle sizes and/or morphologies can be incorporated into the compositions of the present invention to impart the desired properties and characteristics to the compositions.

Particles suitable for use in the coating compositions of the present invention include, for example, those described in U.S. Pat. No. 7,053,149 at col. 19, line 5 to col. 23, line 39, the cited portion of which being incorporated herein by reference.

In certain embodiments of the present invention, the polysiloxane described earlier is nonreactive with the particles.

In certain embodiments, the particles, when added to the other components of the composition, are present in the composition in an amount ranging from 0.01 to 75 weight percent, such as at least 0.1 weight percent, or, in some cases at least 0.5 weight percent or, in yet other cases, at least 5 weight percent, based on total weight of the resin solids of the components which form the composition. The amount of the particles in the composition can range between any combination of the recited values inclusive of the recited values.

Prior to incorporation, one class of particles which can be used according to the present invention includes sols, such as an organosol, of the particles. These sols can be of a wide variety of small-particle, colloidal silicas having an average particle size in ranges such as identified above.

The colloidal silicas can be surface modified during or after the particles are initially formed. These surface modified silicas may contain on their surface chemically bonded carbon-containing moieties, as well as such groups as anhydrous SiO$_2$ groups and SiOH groups, various ionic groups physically associated or chemically bonded within the surface of the silica, adsorbed organic groups, or combinations of any of the foregoing, depending on the characteristics of the particular silica desired. Such surface modified silicas are described in detail in U.S. Pat. No. 4,680,204, which is incorporated herein by reference.

Such materials can be prepared by a variety of techniques in various forms, nonlimiting examples comprise organosols and mixed sols. As used herein the term "mixed sols" is intended to include those dispersions of colloidal silica in which the dispersing medium comprises both an organic liquid and water. Such small particle colloidal silicas are readily available, are essentially colorless and have refractive indices which permit their inclusion in compositions that, without additional pigments or components known in the art to color or decrease the transparency of such compositions, result in colorless, transparent coatings.

Suitable nonlimiting examples of particles include colloidal silicas, such as those commercially available from Nissan Chemical Company under the trademark ORGANOSILICASOLS™, such as ORGANOSILICASOL™ MT-ST, and from Clariant Corporation as HIGHLINK™; colloidal aluminas, such as those commercially available from Nalco Chemical under the trademark NALCO 8676®; and colloidal zirconias, such as those commercially available from Nissan Chemical Company under the trademark HIT-32M®.

The particles can be incorporated into the compositions of the invention in the form of a stable dispersion. When the particles are in a colloidal form, the dispersions can be prepared by dispersing the particles in a carrier under agitation and solvent that is present can be removed under vacuum at ambient temperatures. In certain embodiments, the carrier can be other than a solvent, such as the surface active agents described in detail below, including, but not limited to a polysiloxane containing reactive functional groups, including, but not limited to, the polysiloxane described earlier.

In certain embodiments, the particles, such as colloidal silica, are dispersed in the polysiloxane. Alternatively, the dispersions can be prepared as described in U.S. Pat. No. 4,522,958 or 4,526,910, which are incorporated by reference herein. The particles can be "cold-blended" with the at least one polysiloxane (a) prior to incorporation into the inventive compositions. Alternatively, the particles can be post-added to an admixture of any remaining composition components (including, but not limited to, the polysiloxane) and dispersed therein using dispersing techniques well-known in the art.

When the particles are in other than colloidal form, for example, but not limited to, agglomerate form, the dispersions can be prepared by dispersing the agglomerate in the carrier, for example, but not limited to, the polysiloxane, to stably disperse the particles therein. Dispersion techniques such as grinding, milling, microfluidizing, ultrasounding, or any other pigment dispersing techniques well known in the art of coatings formulation can be used. Alternatively, the particles can be dispersed by any other dispersion techniques known in the art. If desired, the particles in other than colloidal form can be post-added to an admixture of other composition components and dispersed therein using any dispersing techniques known in the art.

In addition to the previously described components, the coating compositions of certain embodiments of the present invention may include other radiation curable components different from those previously described, including, for example, other (meth)acrylate containing compounds. Examples of such materials, which are suitable for use in the present invention include, without limitation, epoxy (meth) acrylates, urethane and polyurethane (meth)acrylates; multifunctional (meth)acrylate monomers; amine-(meth)acrylate adducts; polyester (meth)acrylates; polyalkoxylated and polyether (meth)acrylates; (meth)acrylated acrylic oligomers; and styrene-maleic anhydride or styrene-(meth)acrylic acid oligomers, as well as mixtures thereof.

Epoxy (meth)acrylates are those products formed by the reaction of (meth)acrylic acid with an epoxy (glycidyl) functional component, e.g. aliphatic and aromatic containing epoxy resins, epoxidized oils, acrylic polymers and acrylic grafted polymers in which the acrylic component contains pendent epoxy groups. Some of the (meth)acrylic acid may be replaced by other acids, both ethylenically unsaturated and saturated, so as to impart specific properties e.g. aliphatic acids, fatty acids and aromatic acids.

These products may alternatively be prepared by the reaction of a carboxylic acid functional component (e.g. polyesters and acrylic polymers) with a second component containing both epoxy groups and ethylenic unsaturation e.g. glycidyl acrylate.

Urethane (meth)acrylates are those products formed by the reaction of an isocyanate containing component with a hydroxyl containing component. At least one of these components must contain ethylenic unsaturation. Examples of isocyanate functional components are hexamethylene diisocyanate, isophorone diisocyanate, isocyanate functional acrylic polymers and polyurethanes, reaction products of hydroxyl functional components (e.g. poly-ethylene glycol, poly-propylene glycol and di-, tri- and higher hydroxy functionality aliphatic alcohols (e.g. glycerol and trimethylolpropane) and their ethoxylated, propoxylated and polycaprolactone analogs) with di-, tri- and etcisocyanates (e.g. hexamethylene diisocyanate, isophorone diisocyanate and toluene diisocyanate (TDI)). Examples of hydroxy containing ethylenically unsaturated components are hydroxyethyl (meth)acrylate and its ethoxylated, propoxylated and polycaprolactone analogs.

Multi-functional acrylate monomers include (meth)acrylic acid esters of di-, tri- and higher hydroxy functionality alcohols: e.g. polyethylene glycol, polypropylene glycol, aliphatic diols, neopentyl glycol, ethoxylated bisphenol A, trimethylolpropane, pentaerythritol, glycerol, di-trimethylolpropane, hydroxyl functional polyesters, dipentaerythritol and the ethoxylated, propoxylated and polycaprolactone analogs of all the above.

Amine-(meth)acrylate adducts are those products prepared by the partial "Michael Type Addition" of primary and secondary amines to ethylenic unsaturation i.e. the double bond of acrylate containing compounds. Of particular interest here are the multi-functional (meth)acrylate monomers as mentioned above. Examples of amine-(meth)acrylate adducts are diethylamine modified trimethylolpropane triacrylate and ethanolamine modified ethoxylated trimethylolpropane triacrylate.

Multifunctional acrylates having 5 to 8 (meth)acrylate groups are considered as well known to those skilled in the art, an example of which is dipentaerythritol pentaacrylate.

Polyester (meth)acrylates may be the reaction products of polyester polyols with (meth)acrylic acid. Polyalkoxylated polyolacrylates or polyether acrylates may be obtained by reacting (meth)acrylic acid with respectively polyalkoxylated (ethoxylated or/and propoxylated) polyols or polyether polyols (for example polyether based on ethoxy or/and propoxy repeating units). Acrylated acrylic oligomers may be the reaction products of acrylic oligomeric copolymers bearing epoxy groups (derived for example from glycidyl methacrylate) with acrylic acid. Acrylated oligomers of styrene-maleic anhydride or styrene-(meth)acrylic acid oligomers may be obtained by at least partial esterification of anhydride or acid groups by an hydroxy alkyl acrylate ($C_2$-$C_8$ alkyl).

In addition to the previously described components, the compositions of the present invention may include other components, such as, for example, free radical photoinitiators. Suitable free radical photoinitiators include, but are not limited to, benzophenones, acetophenone derivatives, such as alpha-hydroxyalkylphenylketones, benzoins such as benzoin alkyl ethers and benzyl ketals, monoacylphosphine oxides, and bisacylphosphine oxides. Free radical initiators are commercially available from, for example, Ciba Specialty Chemicals Corporation in their DURACURE and IRGACURE lines; IRGACURE 184, IRGACURE 500, and DURACURE 1173 are particularly suitable.

In certain embodiments, the coating compositions of the present invention comprise 0.01 up to 15 percent by weight of free radical photoinitiator or, in some embodiments, 0.01 up to 10 percent by weight, or, in yet other embodiments, 0.01 up to 5 percent by weight of free radical photoinitiator based on the total weight of the composition.

In certain embodiments, the coating compositions of the present invention also include a catalyst suitable for promoting the reaction between the previously described melamine group-containing polyethylenically unsaturated compound and the previously described polysiloxane, such as the reaction of the plurality of alkoxy groups of the alkoxy group containing melamine group-containing (meth)acrylate described above with hydroxy groups of the hydroxy-functional alkyl ester (meth)acrylate of the polysiloxane described above. Suitable catalysts for this purpose include acidic materials, for example, acid phosphates such as phenyl acid phosphate, and substituted or unsubstituted sulfonic acids, such as dodecylbenzene sulfonic acid or paratoluene sulfonic acid. The catalyst usually is present in an amount ranging from 0.1 to 10.0 percent by weight, such as 0.5 to 4.0 percent by weight, based on the total weight of resin solids in the coating composition.

In certain embodiments, the compositions of the present invention also comprise any of a variety of other additives, such as rheology modifiers, surfactants, UV-light stabilizers, sanding additives, antioxidants, solvents, and flatting agents (e.g. wax-coated or non-wax coated silica or other inorganic materials), among other materials.

In certain embodiments, the coating compositions of the present invention also include a colorant. As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DP-PBO red"), titanium dioxide, carbon black and mixtures thereof. The terms "pigment" and "colored filler" can be used interchangeably.

Example dyes include, but are not limited to, those that are solvent and/or aqueous based such as pthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in United States Patent Application Publication 2005-0287348 A1, filed Jun. 24, 2004, U.S. Provisional Application No. 60/482,167 filed Jun. 24, 2003, and U.S. patent application Ser. No. 11/337,062, filed Jan. 20, 2006, which is also incorporated herein by reference.

Example special effect compositions that may be used in the compositions of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In general, the colorant can be present in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions.

The radiation curable compositions of the present invention may be applied directly onto the surface of a substrate or over an underlayer by any suitable coating process known to those of ordinary skill in the art, for example, by dip coating, direct roll coating, reverse roll coating, curtain coating, spray coating, brush coating, vacuum coating and combinations thereof. The method and apparatus for applying the composition to the substrate may be determined, at least in part, by the configuration and type of substrate material. Dry film thickness can range from, for example, about 0.1 to 4.0 mils (2.5 to 91.6 microns) per layer, such as 0.2 to 2.5 mils (5.1 to 63.5 microns) per layer or, in some embodiments, 0.2 to 1.0 mil (5.1 to 25.4 microns) per layer.

Suitable substrates include cellulosic-containing materials, including paper, paperboard, cardboard, plywood and pressed fiber boards, hardwood, softwood, wood veneer, particleboard, chipboard, oriented strand board, and fiberboard. Such materials may be made entirely of wood, such as pine, oak, maple, mahogany, cherry, and the like. In some cases, however, the materials may comprise wood in combination with another material, such as a resinous material, i.e., wood/resin composites, such as phenolic composites, composites of wood fibers and thermoplastic polymers, and wood composites reinforced with cement, fibers, or plastic cladding. In certain embodiments, such a substrate has been coated or treated with a wood stain and or toner prior to application of the compositions of the present invention.

Suitable metallic substrates include, but are not limited to, foils, sheets, or workpieces constructed of cold rolled steel, stainless steel and steel surface-treated with any of zinc metal, zinc compounds and zinc alloys (including electrogalvanized steel, hot-dipped galvanized steel, GALVANNEAL steel, and steel plated with zinc alloy), copper, magnesium, and alloys thereof, aluminum alloys, zinc-aluminum alloys such as GALFAN, GALVALUME, aluminum plated steel and aluminum alloy plated steel substrates may also be used. Steel substrates (such as cold rolled steel or any of the steel substrates listed above) coated with a weldable, zinc-rich or iron phosphide-rich organic coating are also suitable for use in the process of the present invention. Such weldable coating compositions are disclosed in U.S. Pat. Nos. 4,157,924 and 4,186,036. Cold rolled steel is also suitable when pretreated with, for example, a solution selected from the group consisting of a metal phosphate solution, an aqueous solution containing at least one Group IIIB or IVB metal, an organophosphate solution, an organophosphonate solution, and combinations thereof. Also, suitable metallic substrates include silver, gold, and alloys thereof.

Examples of suitable silicatic substrates are glass, porcelain and ceramics.

Examples of suitable polymeric substrates are polystyrene, polyamides, polyesters, polyethylene, polypropylene, melamine resins, polyacrylates, polyacrylonitrile, polyurethanes, polycarbonates, polyvinyl chloride, polyvinyl alcohols, polyvinyl acetates, polyvinylpyrrolidones and corresponding copolymers and block copolymers, biodegradable polymers and natural polymers—such as gelatin.

Examples of suitable textile substrates are fibers, yarns, threads, knits, wovens, nonwovens and garments composed of polyester, modified polyester, polyester blend fabrics, nylon, cotton, cotton blend fabrics, jute, flax, hemp and ramie, viscose, wool, silk, polyamide, polyamide blend fabrics, polyacrylonitrile, triacetate, acetate, polycarbonate, polypropylene, polyvinyl chloride, polyester microfibers and glass fiber fabric.

Examples of suitable leather substrates are grain leather (e.g. nappa from sheep, goat or cow and box-leather from calf or cow), suede leather (e.g. velours from sheep, goat or calf and hunting leather), split velours (e.g. from cow or calf skin), buckskin and nubuk leather; further also woolen skins and furs (e.g. fur-bearing suede leather). The leather may have been tanned by any conventional tanning method, in particular vegetable, mineral, synthetic or combined tanned (e.g. chrome tanned, zirconyl tanned, aluminum tanned or semi-chrome tanned). If desired, the leather may also be re-tanned; for re-tanning there may be used any tanning agent conventionally employed for re-tanning, e.g. mineral, vegetable or synthetic tanning agents, e.g., chromium, zirconyl or aluminum derivatives, quebracho, chestnut or mimosa extracts, aromatic syntans, polyurethanes, (co) polymers of (meth) acrylic acid compounds or melamine/, dicyanodiamide/and/or urea/formaldehyde resins.

Examples of suitable compressible substrates include foam substrates, polymeric bladders filled with liquid, polymeric bladders filled with air and/or gas, and/or polymeric bladders filled with plasma. As used herein the term "foam substrate" means a polymeric or natural material that comprises a open cell foam and/or closed cell foam. As used herein, the term "open cell foam" means that the foam comprises a plurality of interconnected air chambers. As used herein, the term "closed cell foam" means that the foam comprises a series of discrete closed pores. Example foam substrates include polystyrene foams, polymethacrylimide foams, polyvinylchloride foams, polyurethane foams, polypropylene foams, polyethylene foams, and polyolefinic foams. Example polyolefinic foams include polypropylene foams, polyethylene foams and/or ethylene vinyl acetate (EVA) foam. EVA foam can include flat sheets or slabs or molded EVA forms, such as shoe midsoles. Different types of EVA foam can have different types of surface porosity. Molded EVA can comprise a dense surface or "skin", whereas flat sheets or slabs can exhibit a porous surface.

Once applied, the compositions of the present invention can be cured by, for example, thermal energy followed by radiation. For example, the coating composition can be cured sufficient to form a tack free coating by baking the coating at a peak temperature of 230° F. for 2 minutes, so as to cause the reaction between the previously described melamine group-containing ethylenically unsaturated compounds and the previously described polysiloxane. The radiation curable moieties present in the coating composition may then be cured by irradiation of the coating composition with ultraviolet rays and/or electron beam radiation, as is known to those skilled in the art and described in the Examples. In certain embodiments, the radiation curing can be completed in less than one minute to form a fully cured coating. Moreover, the radiation curing can be conducted in air. Indeed, one benefit of the coating compositions of certain embodiments of the present invention is that a tack-free coating can be produced quickly prior to radiation curing. As a result, so-called "knit lines" as a result of the radiation cure process.

In certain embodiments, the dual cure composition of the present invention is free of colorant and is used to form a transparent clear coating in a multi-component composite coating system comprising a colored basecoat and a transparent, clear topcoat. Indeed, it has been discovered that the intercoat adhesion of such a coating system can be significantly improved by the use of a melamine group-containing polyethylenically unsaturated compound comprising a plurality of alkoxy groups in the dual cure composition of the present invention when the composition is applied directly adjacent to another coating comprising functional groups reactive with the alkoxy groups of the melamine group-containing polyethylenically unsaturated compound. As a result, the present invention is also directed to multi-component composite coatings comprising: (a) a first coating formed from a composition comprising a melamine group-containing polyethylenically unsaturated compound (meth)acrylate comprising a plurality of alkoxy groups; and (b) a second coating deposited directly adjacent to the first coating and comprising a film-forming resin comprising functional groups reactive with the alkoxy groups of the melamine group-containing polyethylenically unsaturated compound. As used herein, the term "directly adjacent" means that no other coatings are disposed between the first coating and the second coating.

Functional groups reactive with the alkoxy groups of the melamine group-containing polyethylenically unsaturated compound include active hydrogen groups, such as hydroxyl groups, primary and secondary amine groups, and carbamate groups. As a result, in these embodiments of the present invention, the second coating may comprise a film-forming resin selected from an acrylic polyol, a polyester polyol, a polyurethane polyol, a polyether polyol, and mixtures of any of the foregoing. Such polymers can be prepared by methods well understood by those skilled in the art including as described in U.S. Pat. No. 7,053,149 at col. 32, line 58 to col. 35, line 63, the cited portion of which being incorporated herein by reference.

Illustrating the invention are the following examples that are not to be considered as limiting the invention to their details. All parts and percentages in the examples, as well as throughout the specification, are by weight unless otherwise indicated.

Example 1

A mixture of 2892.1 g allyl glycidyl ether, 0.295 g sodium acetate, 11.784 g Magnesol, and 22.252 g cyclohexanone were placed in a 12 L flask with a nitrogen blanket. To this was added 234 microliters of a solution of chloroplatinic acid in isopropanol (7.5% by weight). This mixture was then heated to 80° C. Once at temperature, 3000.0 g of Masil Wax Base was added at a rate not to exceed an exotherm temperature of 105° C. When the addition was complete, the reaction was held at 95° C. until the Si—H peak at 2200 cm$^{-1}$ was gone (~1 hr). The mixture was then cooled and filtered through Whatman #6 filter paper to remove the magnesol. The product had an epoxy equivalent weight of 231.6.

Example 2

Under an air atmosphere, a flask was charged with 4800.0 g of the product of Example 1, 12.916 g triphenylphosphite, 32.289 g dimethyldodecylamine, and 5.166 g of MEHQ. This mixture was heated to 80° C. and 1657.8 g of acrylic acid was added over a 1 hour period. The reaction was then heated to 100° C. and held until the acid value was ~30 mg KOH/g sample (10 hr). The final product had an acid value of 28 mg KOH/g sample, and an OH value of 171.6 mg KOH/g sample.

Example 3

To 3000.0 g of the product of Example 2 was added dropwise with stirring at room temperature under an air atmosphere, 2036.3 g of a colloidal silica dispersion in methanol (MT-ST from Nissan, 30% SiO$_2$). The cloudy mixture was then warmed to 35° C. and the methanol was removed under vacuum to a level of 3.5% to yield a clear, pale yellow liquid.

Example 4

To a reaction flask equipped with a means for maintaining a nitrogen blanket, was added 1006.1 kg of trimethylolpropane monoallyl ether and 94.6 g of anhydrous sodium acetate. The mixture was sparged with nitrogen for 35 minutes with stirring at room temperature, and a solution of chloroplatinic acid (43.0 g in 530.0 g of isopropanol) was added, followed by 907 g of toluene. The mixture was heated to 80° C., and 728.0 kg of Silres IC 816 (polysiloxane containing silicon hydride, available from Wacker Chemical Corporation) was added over 5 hours and 30 minutes, and 1.8 kg of toluene was added as a line rinse. The temperature was maintained at 80° C. until the silicon hydride peak at 2150 cm$^{-1}$ in the infrared spectrum was no longer observable.

Example 5

A reaction flask equipped for vacuum distillation was flushed with N$_2$. To the reaction flask was added 370.0 g of the product of Example 4, 411.2 g of ORGANOSILICASOL MT-ST (colloidal silica available from Nissan Chemicals), and 144.1 g of methyl amyl ketone. The resulting mixture was vacuum distilled from 20 to 52° C. at 70 mmHg until 261.3 g of solvent had been removed. The mixture was heated to 40° C. for 2 hours, to 60° C. for an additional 2 hours, and finally to 89° C. for 30 minutes.

Example 6

To a reaction flask equipped with a reflux condenser was added 240.9 g of the product of Example 5 under air atmosphere. The flask was heated to 60° C. and 61.7 g of hexahydrophthalic anhydride was added over 30 minutes, followed by 38.1 g of methyl amyl ketone. The mixture was kept at 60° C. for 2 hours, and then heated to 90° C. When the anhydride peak at 1790 cm$^{-1}$ in the infrared spectrum was no longer observable, 0.307 g of 4-methoxyphenol and 0.305 g of triphenyl phosphite were added. After 5 minutes, 72.2 g of glycidyl methacrylate was added over 30 minutes. After the first 5 minutes of the glycidyl methacrylate addition, 0.545 g of benzyldimethylamine was added to the reaction flask. The reaction temperature was maintained at 90° C. for about 14 hours, and then 1.69 g of benzyldimethylamine was added. After about 17 additional hours at 90° C., 12.1 g of glycidyl methacrylate was added. After about 6 more hours, a final acid value of 9.5 was reached.

Example 7

A coating composition was prepared by mixing together the ingredients identified in TABLE 1 under agitation in the order in which they appear:

TABLE 1

| Ingredients | Sample A | Sample B | Sample C | Sample D |
| --- | --- | --- | --- | --- |
| Methyl Acetate | 20.0 | 20 | 15.0 | 15.0 |
| Methyl Amyl-Ketone | 20.0 | 20 | 15.0 | 15.0 |
| 1,6-Hexanedioldiacrylate[1] | 9.42 | 9.42 | 9.42 | 9.42 |
| Modaflow ®[2] | 0.5 | 0.5 | 0.5 | 0.5 |
| Silica Dispersion[3] | 13.39 | 13.39 | 0.0 | 0.0 |

TABLE 1-continued

| Ingredients | Sample A | Sample B | Sample C | Sample D |
|---|---|---|---|---|
| Tinuvin 400 UVA[4] | 2.0 | 2.0 | 2.0 | 2.0 |
| Tinuvin 123 HALS[5] | 1.0 | 1.0 | 1.0 | 1.0 |
| CAB381.20.[6] | 3.00 | 3.00 | 3.0 | 3.0 |
| CAB106E Polymerizable CAB[7] | 3.00 | 3.00 | 3.0 | 3.0 |
| Product of Example 2 | 3.65 | 3.65 | 0.0 | 0.0 |
| Product of Example 3 | 16.64 | 16.64 | 0.0 | 0.0 |
| Urethane Acrylate[8] | 18.85 | 52.96 | 66.27 | 32.16 |
| Dipentaerythritolpentaacrylate[9] | 9.42 | 14.00 | 14.0 | 9.42 |
| Bisphenol A epoxy acrylate[10] | 10.31 | 10.31 | 10.31 | 10.31 |
| Melamine Acrylate[11] | 38.69 | 0 | 0.0 | 38.69 |
| Phenyl Acid Phosphate[12] | 4.67 | 4.67 | 4.67 | 4.67 |
| Darocur 4265[13] | 3.5 | 3.5 | 3.5 | 3.5 |

[1]Difunctional Diluent available from Sartomer.
[2]Flow Additive available from Cytec.
[3]A total of 225 parts of Dowanol PM ® (Propylene glycol methyl ether, available from Dow Chemical Co.) was added slowly at room temperature to 1482 parts of a 20% solution of colloidal silica in water available from Nissan Chemical as SNOWTEX O ®. The mixture was heated to 50° C. in a suitable reactor equipped with temperature probe, addition funnel and vacuum distillation apparatus. When the mixture reached 50° C., the pressure in the reactor was reduced to about 60 to 100 mmHg to effect distillation, while an additional 1442 parts of DOWANOL PM ® was added slowly to the reaction mixture. A total of 2162 parts of distillate was removed, bringing the contents of the reactor to about 30% solids. 4.9 parts of poly(butyl acrylate) were then added to the reaction mixture. 395 parts of the tetraol-functional siloxane (as described in patent U.S. Pat. No. 6,387,519) were mixed with 296 parts of n-propyl alcohol and this mixture was then added to the contents of the reactor over about a 1 hour period. A total of about 460 parts of solvent were then removed by vacuum distillation. Finally, 343 parts of methyl amyl ketone were added to the reactor contents over about a 15 minute period and 343 parts of distillate were subsequently removed from the reaction mixture by vacuum distillation. The final reaction mixture was allowed to cool slightly, and then poured into a suitable container. The final product was a slightly hazy solution that was found to have a measured solids of 58% and to have a Gardner-Holt viscosity of <A.
[4]UV absorber available from Ciba Additives.
[5]Hindered amine light stabilizer available from Ciba Additives.
[6]Flow Additive available from Eastman Chemical.
[7]Flow additive available from Bomar.
[8]Urethane Acrylate available from Sartomer.
[9]Multifunctional Acrylate available from Sartomer.
[10]Epoxy Acrylate available from Sartomer.
[11]Melamine Acrylate available from Bomar.
[12]Phenyl Acid Phosphate available from Islechem LLC.
[13]Darocur 4265 available from Ciba Additives.

Samples A through D were spray applied to fully cured basecoat (over ED6060 metal panels) using conventional siphon feed spray equipment. These panels were then exposed to infrared heating for a total of 4 minutes. These panels were then placed on a conveyor system (10 fpm) and passed under a 600 watt/inch UV lamp with an overall total energy of 1055 mJ/cm$^2$ (measured with a EIT radiometer) to obtain a full cure. Approximately 1 hour later they were all tested for initial adhesion, DOI, and gloss retention after abrasion test with results located in Table 2.

TABLE 2

| Sample | DFT | Initial Adhesion | Inorganic Particles | Contains Melamine | DOI | Mar Gloss | Gloss Retention |
|---|---|---|---|---|---|---|---|
| A | 3.6 | 100% | Yes | Yes | 98.24 | 67 | 81.70% |
| B | 3.0 | 0% | Yes | No | 95.9 | 45 | 57% |
| C | 3.9 | 100% | No | No | 97.6 | 8 | 9.20% |
| D | 2.6 | 100% | No | Yes | 86 | 54 | 60.70% |

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

We claim:

1. A multi-component composite coating comprising:
   (a) a first coating formed from a composition comprising a melamine group-containing polyethylenically unsaturated compound comprising a plurality of alkoxy groups; and
   (b) a second coating deposited directly adjacent to the first coating and comprising a film-forming resin comprising functional groups reactive with the alkoxy groups of the melamine group-containing polyethylenically unsaturated compound.

2. The multi-component composite coating of claim 1, wherein the first coating is formed from a composition further comprising a polysiloxane having the general structure:

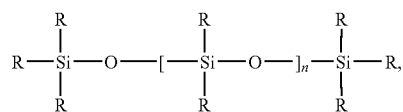

wherein n ranges from 0 to 100 and each R, which may be identical or different, represents a group selected from H, OH, a monovalent hydrocarbon group, a monovalent siloxane group, a hydroxy-functional alkyl ester (meth)acrylate, and mixtures of any of the foregoing, with the proviso that at least one of the groups represented by R is a hydroxy-functional alkyl ester (meth)acrylate.

3. The multi-component composite coating of claim 1, wherein the melamine group-containing polyethylenically unsaturated compound comprises a melamine group-containing poly(meth)acrylate.

4. The multi-component composite coating of claim 1, wherein the melamine group-containing polyethylenically unsaturated compound is represented by the general formula:

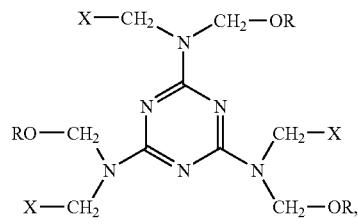

wherein each R, which may be the same or different represents a $C_1$-$C_4$ alkyl group, and each X, which may be the same or different, represents a moiety comprising a carbon-carbon double bond.

5. The multi-component composite coating of claim 1, wherein the first coating is formed from a composition further comprising a plurality of particles, wherein the particles comprise colloidal silica.

* * * * *